United States Patent
Shiraishi et al.

(10) Patent No.: US 7,589,782 B2
(45) Date of Patent: Sep. 15, 2009

(54) IMAGING APPARATUS AND IMAGING METHOD FOR REDUCING RELEASE TIME LAG

(75) Inventors: Kenji Shiraishi, Tokyo (JP); Kei Ito, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 855 days.

(21) Appl. No.: 10/764,438

(22) Filed: Jan. 27, 2004

(65) Prior Publication Data
US 2004/0252224 A1    Dec. 16, 2004

(30) Foreign Application Priority Data
Feb. 6, 2003 (JP) .............................. 2003-028961
Feb. 6, 2003 (JP) .............................. 2003-028962

(51) Int. Cl.
*G03B 7/00* (2006.01)
*H04N 5/235* (2006.01)
*H04N 3/14* (2006.01)
*H04N 5/335* (2006.01)

(52) U.S. Cl. ..................................... 348/362; 348/312
(58) Field of Classification Search ................ 348/362, 348/363, 222.1, 229.1, 311, 312, 296–299
See application file for complete search history.

(56) References Cited

U.S. PATENT DOCUMENTS

| | | | | |
|---|---|---|---|---|
| 4,984,002 A | * | 1/1991 | Kokubo ...................... | 348/296 |
| 5,760,830 A | * | 6/1998 | Kinoshita et al. ......... | 348/220.1 |
| 5,767,904 A | * | 6/1998 | Miyake ...................... | 348/362 |
| 6,243,136 B1 | * | 6/2001 | Sasaki ........................ | 348/362 |
| 6,812,965 B1 | * | 11/2004 | Kijima et al. ................ | 348/312 |
| 6,822,689 B1 | * | 11/2004 | Nakakuki et al. ........... | 348/364 |
| 6,995,801 B1 | * | 2/2006 | Nakakuki et al. ........... | 348/364 |
| 7,187,409 B2 | * | 3/2007 | Nakahira et al. ............ | 348/243 |

(Continued)

FOREIGN PATENT DOCUMENTS

JP    2000-013689    1/2000

(Continued)

OTHER PUBLICATIONS

U.S. Appl. No. 11/028,307, filed Jan. 4, 2005, Shiraishi.

(Continued)

*Primary Examiner*—Sinh Tran
*Assistant Examiner*—Christopher K Peterson
(74) *Attorney, Agent, or Firm*—Oblon, Spivak, McClelland, Maier & Neustadt, P.C.

(57) ABSTRACT

An imaging apparatus includes an exposure period setup part for generating a timing signal, an image pick up device control part for controlling an operation of image pick up device, a timing part for measuring an elapsed time from the exposure period timing signal, and an imaging apparatus control part for controlling the image pick up device control part and the exposure period setup part. The timing part measures the elapsed time from the exposure period timing signal right after a release operation to the beginning of exposure setup operation by the exposure period setup part, and if a time from the measured elapsed time to the generation of the calculated next exposure period timing signal is equal or greater than a predetermined time, the imaging apparatus control part shortens the time till the generation of the next exposure period timing signal from a regular exposure period.

9 Claims, 10 Drawing Sheets

U.S. PATENT DOCUMENTS 7,274,391 B2 * 9/2007 Shepherd et al. ............ 348/243
2003/0133026 A1 * 7/2003 Shepherd et al. ............ 348/243

FOREIGN PATENT DOCUMENTS

JP        2001-008114        1/2001

OTHER PUBLICATIONS

U.S. Appl. No. 10/244,670, filed Sep. 17, 2002, Sannoh et al.
U.S. Appl. No. 10/270,314, filed Oct. 15, 2002, Shinohara et al.
U.S. Appl. No. 10/354,193, filed Jan. 30, 2003, Shiraishi.
U.S. Appl. No. 10/354,086, filed Jan. 30, 2003, Ojima et al.
U.S. Appl. No. 10/359,691, filed Feb. 7, 2003, Shiraishi.

* cited by examiner

IMAGING APPARATUS AND IMAGING METHOD FOR REDUCING RELEASE TIME LAG

BACKGROUND OF THE INVENTION

1. Field of the Invention

The present invention relates to an imaging apparatus, an imaging method, a program, and a recording medium, adapted to shorten a time (hereinafter referred to as a release time lag) from a time that a shutter release button is pressed for a release operation to a time that an exposure is actually started.

2. Description of the Prior Art

Conventionally, for a digital camera having a solid state imaging device such as a CCD, there has been proposed a technology for exposing and reading out the electric charge accumulated on the CCD by the exposure based on an external trigger signal which is asynchronous to a vertical synchronizing signal for controlling the operation of CCD (for example, see Japanese Patent Laid-Open 2000-13689). Moreover, there has been proposed a technology for generating a vertical synchronizing signal for starting an exposure period and for reading out electric charge by an external trigger signal (for example, see Japanese Patent Laid-Open 2001-8114).

However, a circuit for generating an electric charge reading out pulse in synchronization with the external trigger is required in Japanese Patent Laid-Open 2000-13689. A circuit for generating a vertical synchronizing signal in synchronization with the external trigger is also required in Japanese Patent Laid-Open 2001-8114.

More specifically, when reading out the electric charge in a monitoring operation and a recording operation for monitoring an object before photographing, because what are disclosed in the prior art references as described above require different circuits for each of the monitoring and recording operations, so that there has been a problem which boosts a cost, increases power consumption, and a circuit area by increment of a circuit.

SUMMARY OF THE INVENTION

The present invention has been made in view of the aforementioned problems, and an object of the present invention is to provide an imaging apparatus, an imaging method, a program, or a recording media, adapted to shorten a release time lag without increasing a cost, power consumption, and a circuit area by reading out electric charge in a monitoring operation for monitoring an object before photographing and in a recording operation by the same circuit.

The present invention essentially comprises an exposure period setup part for generating a timing signal which prescribes an exposure period of an image pick up device, an image pick up device control part for controlling the operation of the image pick up device by synchronizing to the exposure period timing signal, a timing part for measuring an elapsed time from the exposure period timing signal, and an imaging apparatus control part for controlling the image pick up control part and the exposure period setup part.

In a first aspect of the present invention, the timing part measures the elapsed time from the exposure period timing signal right before the beginning of the exposure setup operation to the beginning or the completion of the exposure setup operation by the exposure period setup part, in accordance with a comparison result between the time from the beginning or the completion of the exposure setup operation calculated by the measured elapsed time to the generation of next exposure period timing signal and a predetermined time, the imaging apparatus control part alternatively selects the time till the generation of the next exposure period timing signal from the exposure period of the regular exposure period or the exposure period which is earlier than the regular exposure period.

The exposure period timing signal right before the beginning of the exposure setup operation is, for example, the exposure period timing signal right after a release operation, the exposure period timing signal right before the release operation, or the exposure period timing signal right before the beginning of the exposure setup operation when processing except the exposure setup after the release operation is conducted and after a plurality of exposure period timing signals.

The time from the shutter release button is pressed for the release operation till the generation of the exposure period timing signal can be shortened by selecting the time till the generation of the next exposure period timing signal. Moreover, since a regular exposure period timing signal is a vertical synchronizing signal in an monitoring operation and so on, a single vertical synchronizing signal for reading out the electric charge in the monitoring operation and in the recording operation is used and can be processed by a soft ware in a common circuit without requiring an individual circuit for each, so that a release time lag can be shortened without boosting a cost, increasing power consumption, and increasing a circuit area.

In a second aspect of the present invention, the elapsed time from the exposure period timing signal right before the input requesting the exposure setup event to the input requesting the exposure setup event is measured, by using the measured elapsed time, in other words, the period of the input requesting the exposure setup event is judged, and the imaging apparatus control part decides the exposure setup time appropriately in accordance with the judgment result.

Therefore, for example, the starting time of the exposure setup from the shutter release button is pressed for the release operation can be shortened comparing to the conventional method. Moreover, since the processing can be conducted by the software processing, reading out each electric charge in the monitoring operation and the recording operation is conducted without requesting the individual circuit for each operation, and can be processed by the common circuit, so that the release time lag can be shortened without boosting a cot, increasing power consumption, and increasing an circuit area.

DETAILED DESCRIPTION OF THE PREFERRED EMBODIMENT

Hereinafter, embodiments of the present invention will be described with reference to the accompanying views. The same reference numerals are applied for the same configuration parts and the same processing illustrated in each view.

First Embodiment

Figure 1A:
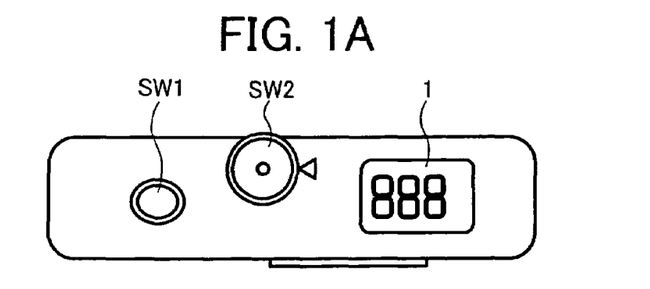
FIG. 1A is a top view illustrating the appearance of digital camera according to the present invention.
Figure 1B:
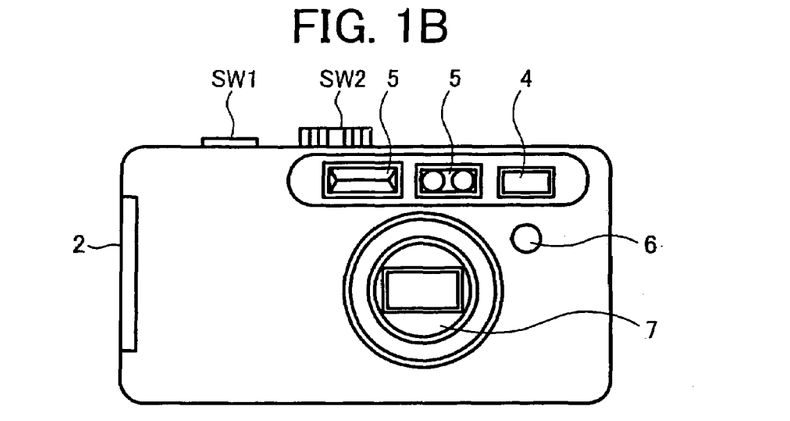
FIG. 1B is a front view illustrating the appearance of digital camera according to the present invention.
Figure 1C:
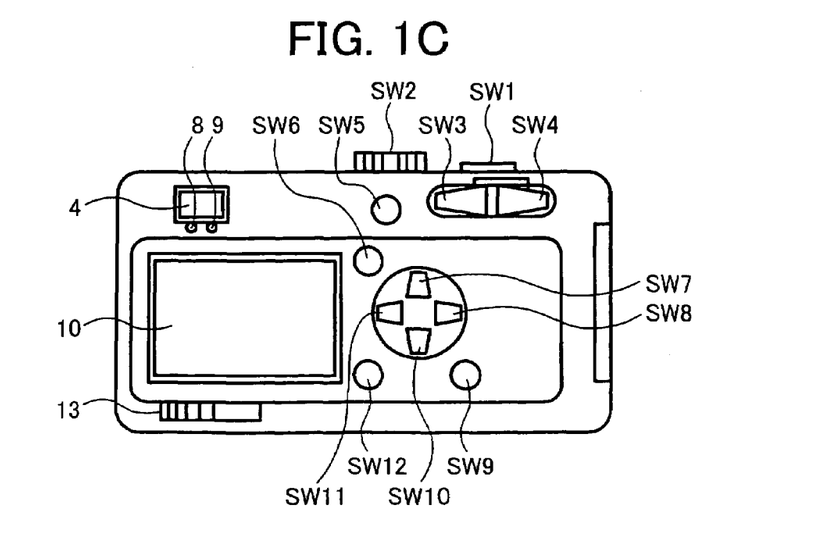
FIG. 1C is a bottom view illustrating the appearance of digital camera according to the present invention.

FIG. 1A, 1B, and 1C illustrate the appearance of digital camera which is an example of imaging apparatus according to the present invention, respectively.

The digital camera according to the present invention comprises a camera crone unit 7 disposed in a camera body as shown in FIG. 1A to FIG. 1C. The camera crone unit 7 comprises a zoom optical system 7-1 having a zoom lens 7-1a for taking in an optical image of object and a zoom driving motor 7-1b, a focus optical system 7-2 having a focus lens 7-2a and a focus driving motor 7-2b, an aperture stop unit 7-3 having an aperture stop 7-3a and an aperture stop motor 7-3b, a mechanical shutter unit 7-4 having a mechanical shutter 7-4a and a mechanical shutter motor 7-4b, and a motor driver 7-5 for driving respective motors 7-1b to 7-4b. The motor driver 7-5 is controlled to be driven by the driving instruction from a CPU block 104-3 provided in an after-mentioned digital still camera processor 104 disposed in the camera body based on the input of a remote control light receiving part 6 and the operation input of an operation part Key unit SW1 to SW13.

The Key unit includes a release shutter SW1, a mode dial SW2, a zoom switch (wide) SW3, a zoom switch (tele) SW4, a self-timer or delete switch SW5, a menu switch SW6, a up or strobe switch SW7, a right switch SW8, a display switch SW9, a down or macro switch SW10, a left or image confirmation switch SW11, and a OK switch SW12.

Figure 2A:
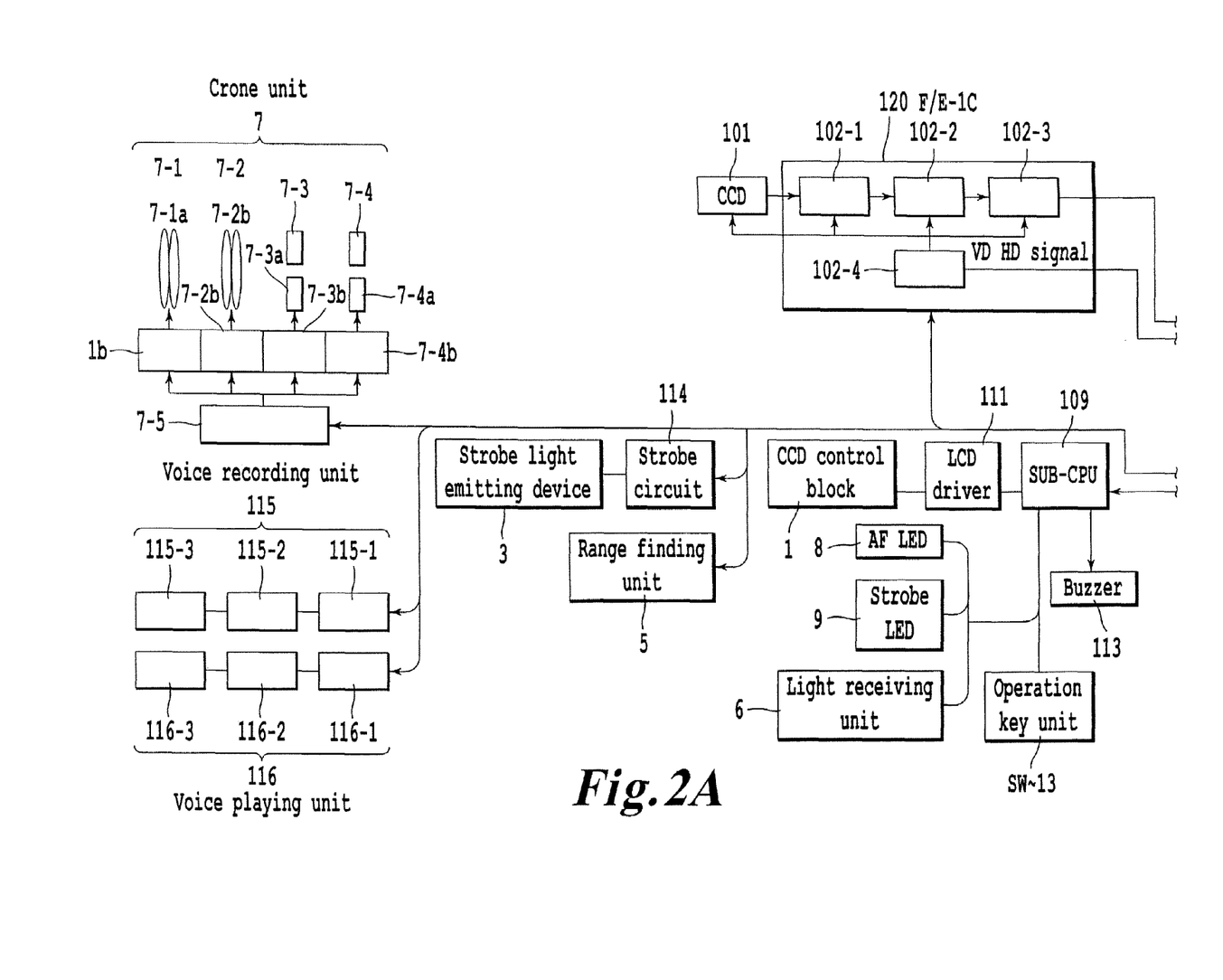
FIGS. 2A and 2B depict a block diagram of a digital camera according to the present invention.
Figure 2B:
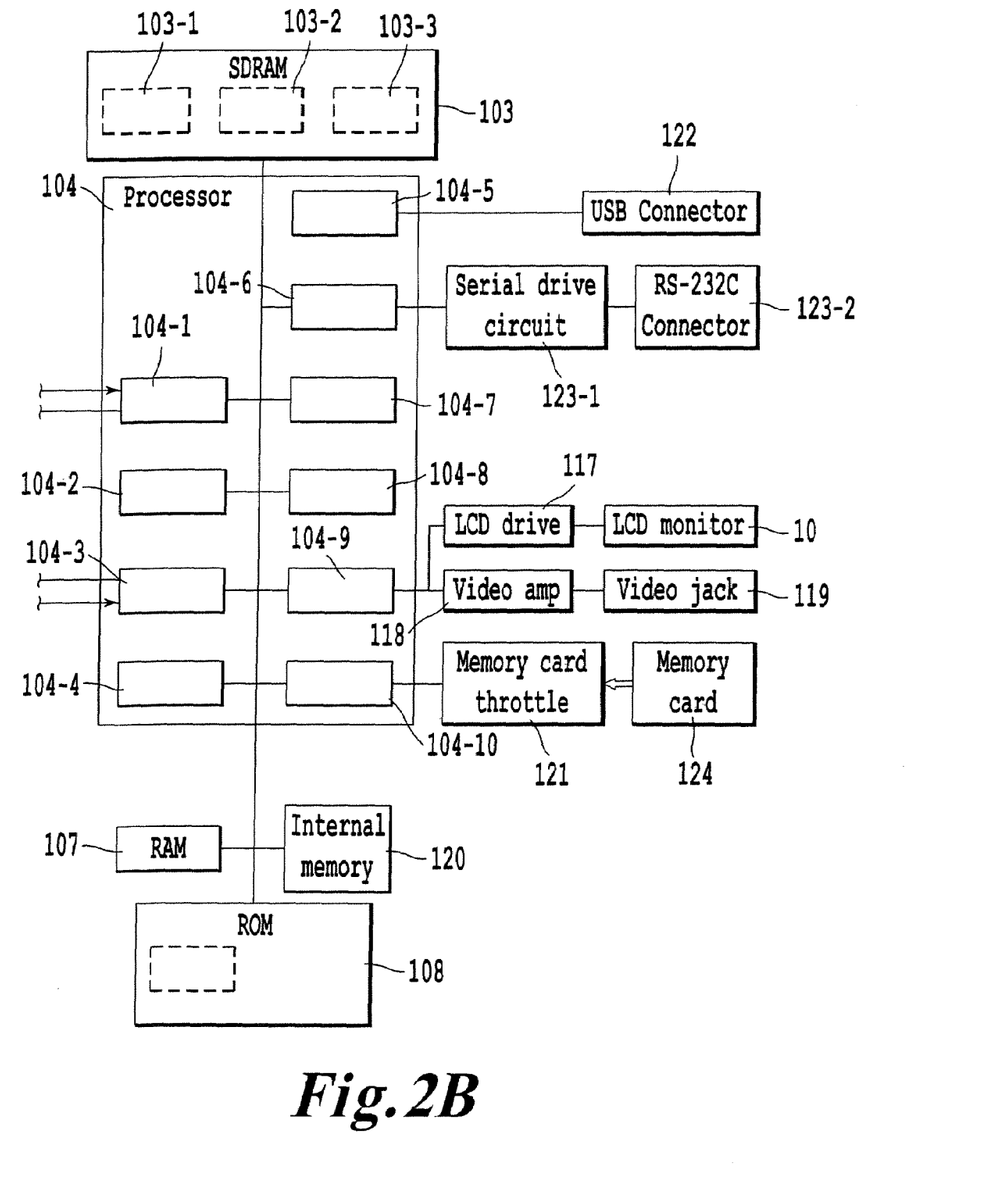

Control programs, which are written by readable cords of the CPU block 104-3, and various parameters for controlling are stored in a ROM 108. If the power supply of the digital camera is turned on by the operation of power switch SW13 of this digital camera, the programs are loaded in a main memory (not shown). The CPU block 104-3 in a processor 104 controls the operations of each part of the digital camera in accordance with the programs loaded in the main memory, while temporary stores data and the like required for controlling in a RAM 107 and a Local SRAM 104-4 in the digital still camera processor 104. A control program and a parameter for controlling can be changed by using a flash ROM which is capable of rewriting to the ROM 108, so that a version upgrade of function can be carried out easily.

A CCD 101 is a solid state imaging device for photoelectric conversion of an optical image. A F/E (front and end)-IC 102 for receiving an image electric signal output from the solid state imaging device comprises a CDS 102-1 for conducting correlation double sampling to eliminate image noise, an AGC 102-2 for conducting a gain adjustment, an A/D conversion circuit 102-3 for converting an analogue signal into a digital signal, and a timing generator TG 102-4. The timing generator TG 102-4 generates a driving timing signal for the CCD 101 and the F/E-IC 102, which are controlled by the CPU block 104-3, based on a vertical synchronizing signal (hereinafter referred to VD) and a horizontal synchronizing signal (hereinafter referred to HD) supplied from a CCD 1 control block 104-1.

The digital still camera processor 104 applies a white balance setup and a gamma setup to the data input from the CCD 101 through the F/E-IC 102. The digital still camera processor 104 comprises the CCD 1 control block for supplying the above mentioned VD signal and HD signal to the timing generator TG 102-4, i.e. a CCD 1 signal processing block 104-1, the CCD 2 control block for converting the image data which passed thorough the CCD 1 signal processing block into luminance data and color difference data by filtering processing, i.e. a CCD 2 signal processing block 104-2, the CPU block 104-3 for controlling the operations of respective parts of above described devices, and the Local SRAM 104-4 for temporarily storing the data, and so on required for the above described controls. The digital still camera processor 104 comprises an USB block 104-5 for conducting an USB communication with an external device such as a personal computer, a serial block 104-6 for conducting a serial communication with an external device such as a personal computer, a JPEG CODEC block 104-7 for conducting JPEG compression and decompression, a RESIZE block 104-8 for enlarging and reducing a size of image data by interpolation processing, a TV signal display block 104-9 for converting image data into a video signal for displaying on an external display device such as a liquid crystal monitor or a TV, and a memory card block 104-10 for controlling a memory card, which stores the photographed image data.

The SDRAM 103 connected to the digital still camera processor 104 temporarily stores the image data when the varied possessing is applied to the image data by the digital still camera processor 104. The image data to be stored are loaded into the digital still camera processor 104 from the CCD 101 through F/E-IC 102, for example, and the image data include the RAW-RGB image data 103-1 which are applied the white balance setup and the gamma setup by the CCD1 signal processing block 104-1, the YUV image data 103-2 which are conducted the luminance data and color difference data conversion by the CCD2 signal processing block 104-2, the JPEG image data 103-3 which are compressed by the JPEG CODEC block 104-7, and so on.

A memory card throttle 121 connected to the memory card controller block 104-10 is for disposing a memory card 124 removably to the digital camera. An internal memory 120 connected to the digital still camera processor 104 is the memory which can store the photographed image data when the memory card 124 is not disposed in the memory card throttle 121.

A LCD driver 117 is a driving circuit for driving a LCD monitor 10, and comprises a function for converting the video signal output from the TV signal display block 104-9 into the signal for displaying on a LCD monitor 10.

The LCD monitor 10 is for monitoring the state of object before photographing, for confirming the photographed image, for displaying the image data recorded in the internal memory 120 or the memory card, and so on.

A video AMP 118 is the amp for carrying out an impedance conversion in order for the output impedance of video signal output from the TV signal display block 104-9 to be of 75Ω, and a video jack 119 is for connecting with an external display device such as a TV.

An USB connector 122 is for conducting an USB connection with an external device such as a personal computer.

A serial driver circuit 123-1 is the circuit for converting the output signal of serial block 104-6 into an appropriate voltage in order to conduct a serial communication with an external device such as a personal computer. A RS-232C connector 123-2 connected to the serial driver circuit is the connector to conduct the serial connection of digital camera to an external device such as a personal computer.

A SUB-CPU 109 connected to the CPU block 104-3 is the CPU in which ROM and RAM are built in one chip, and outputs the output signal of the operation key unit SW1 to 13 and the remote control light receiving part 6 as operation information of user to the CPU block 104-3. The SUB-CPU 109 converts the electric signal, which indicates the condition of camera, output from the CPU block 104-3 into respective control signals in order to drive the after mentioned sub LCD 1, AF LED 8, strobe LED 9, and buzzer 113, and outputs the respective control signals thereto.

The sub LCD 1 is the displaying part for displaying photographable number of sheets, for example, and the LCD driver 111 is the driving circuit for driving the sub LCD by the output signal of SUB-CPU 109.

The AF LED 8 is the LED for displaying the focusing state at the time of photographing, and the strobe LED 9 is the LED for displaying the charging state of strobe. The LED 8 and the LED 9 can be used for another displaying such as displaying a memory card access state.

The operation key unit SW1 to 13 is the key circuit operated by a user, and the remote control light receiving part 6 is the receiving part for receiving the operations by a user and the light signal from the remote control sending device (not shown).

A voice recording unit 115 comprises a microphone 115-3 for inputting a voice signal by a user, a microphone AMP 115-2 for amplifying the input voice signal, and a voice recording circuit 115-3 for recording the amplified voice signal.

A voice playing unit 116 comprises a voice playing circuit 116-1 for converting the recorded voice signal into the signal which can output from a speaker, an audio AMP 116-2 for amplifying the converted voice signal and for driving the speaker, and a speaker 116-3 for outputting the voice signal. Both of the units 115 and 116 are operated under the control of the CPU block 104-3.

Next, a series of flow for a photographing operation will be simply described. When the SUB-CPU 109 detects the power switch SW13 of digital camera is turned on by a user, the CPU block 104-3 conducts predetermined setups to the CCD 101, the F/E-IC 102, the CCD 1 signal processing block 104-1, the CCD2 signal processing block 104-2, the TV signal display block 104-9, the video amp 118, and so on. By this setup, the optical image entered through the camera crone unit 7 of lens unit is photo-electrically converted in the CCD 101, and outputs to the F/E-IC 102 as an analogue electric signal. The analogue electric signal is provided with a gain adjustment and an A/D conversion in the F/E-IC 102 of front end integrated circuit, and then is input to the CCD 1 signal processing block 104-1 of digital still camera processor 104 as a digital signal.

In the CCD 1 signal processing block 104-1, the above described processing such as the white balance adjustment and the gamma conversion are conducted, and the data after the processing are stored in the SDAM 103 once. The RAW-RGB image data stored in the SDRAM 103 are red out by the CCD 2 signal processing block 104-2, and are written back to the SDRAM 103 as the YUV image data after the YUV conversion. The YUV image data which are written back to the SDRAM 103 are red out by the TV signal display block 104-9, and for example, if the destination to be output is a TV of NTSC system, is output to a TV (not shown) through the video amp 118 after receiving magnification processing by horizontal and vertical synchronizing signals according to the system. Monitoring which is a display for confirming before still photographing is conducted by carrying out this processing for each vertical synchronizing signal VD.

When the SUB-CPU 109 detects the release operation by pressing the shutter release button SW1, the CPU block 104-3 performs a focusing operation by driving the focus lens 7-2a through the motor drive 7-5 based on the distance data obtained by the range finding unit 5. The CPU block 104-3 carries out a setup for exposure in order to record a still image to the F/E-IC 102 and the CCD 101 after the focusing operation is completed.

The CPU block 104-3 closes the mechanical shutter 7-4a by driving the mechanical shutter 7-4a through the mechanical shutter motor 7-4b at the same time that the exposure is completed. The CPU block 104-3 conducts the setup for loading the still image into the CCD 1 signal processing block 104-1 right before the exposure is completed, and loads the data from the CCD 101 when the exposure is completed. The CPU block 104-3 also drives the strobe circuit 114 whose charge state is displayed by the strobe LED 3.

The RAW-RGB image data loaded in the SDRAM 103 through the CCD 1 signal processing block 104-1, as well as at the time of monitoring, are red out by the CCD 2 signal processing block 104-2, and receive the YUV conversion, and then the data are thereby written back to the SDRAM 103 as the YUV image data. The YUV image data written back to the SDRAM 103 are red out by the JPEG CODEC block 104-7, and are written back to the SDRAM again after receiving the JPEG compression. Moreover, after predetermined header information is applied to the data, the data are stored in the memory card 124 in accordance with a predetermined format such as DOS. At the same time, the YUV image data are sent to the TV signal display block 104-9, and the image is thereby displayed on the TV and so on.

Figure 3:
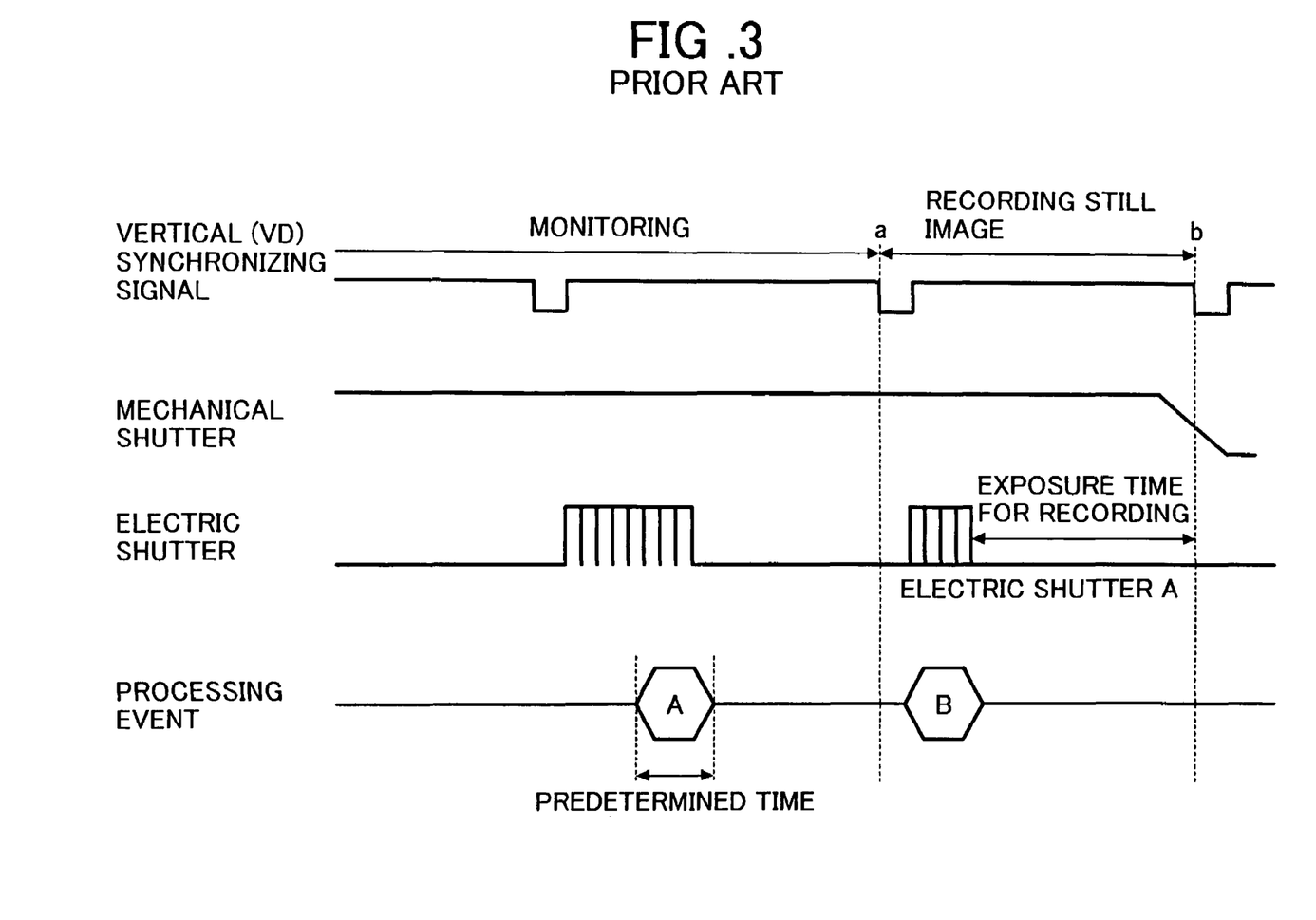
FIG. 3 is a timing chart illustrating an exposure operation of conventional digital camera.
Figure 4:
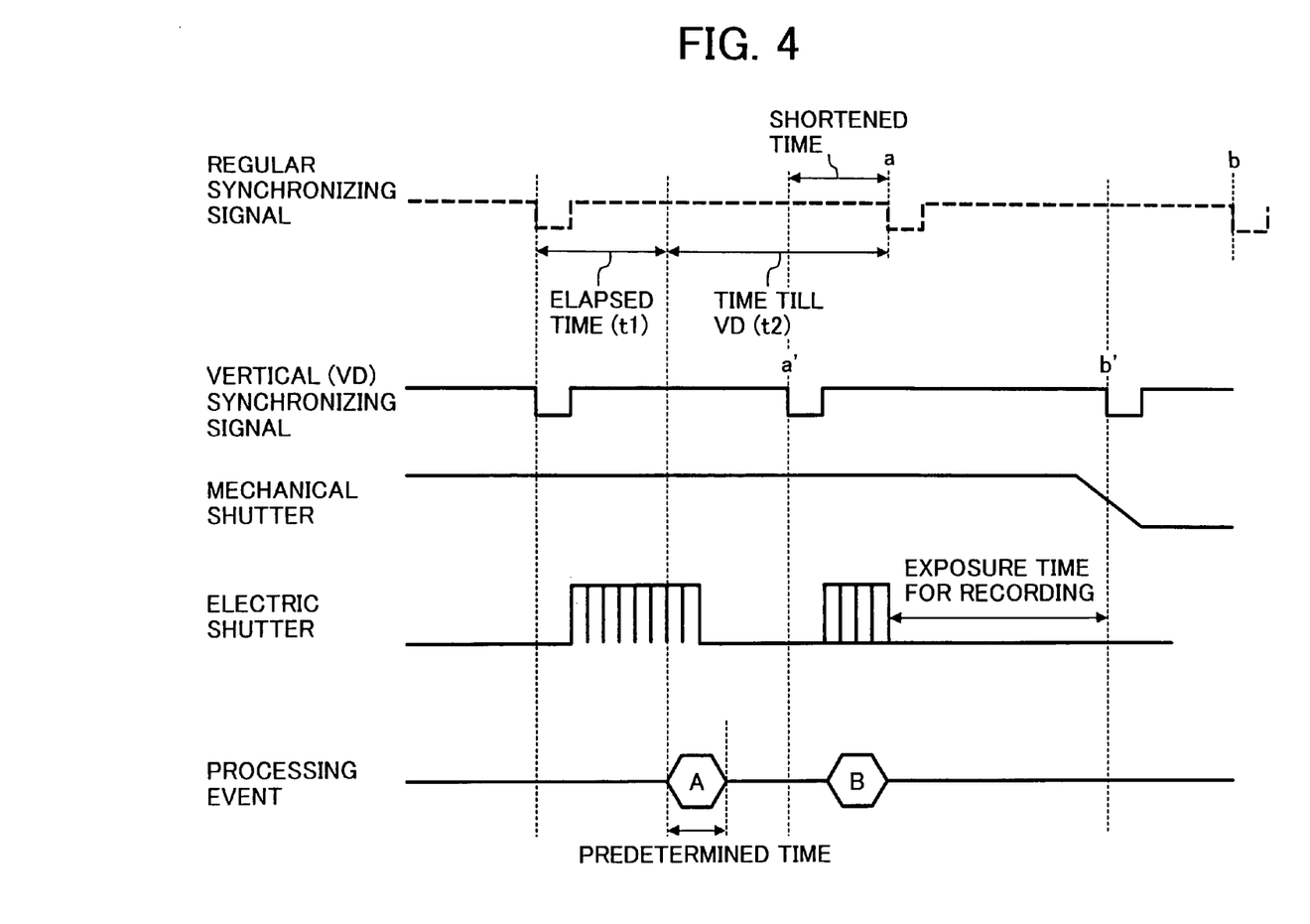
FIG. 4 is a timing chart illustrating an exposure operation in a first embodiment of digital camera according to the present invention.

Next, the timing chart of FIG. 4 illustrating a first embodiment of the present invention will be described by comparing it 2 with FIG. 3 illustrating its prior art. At this point, the image pick up device of the present invention corresponds to the CCD 101, an image pick up control part corresponds to the F/E-IC 102, an exposure period setup part corresponds to the CCD 1 signal processing block 104-1, and a imaging apparatus control part and a timing part correspond to the CPU block 104-3.

FIG. 3 illustrates timing by a conventional method without shortening a time. The F/E-IC changes the operation mode of next exposure period by the data set up until the F/E-IC setup confirmation timing of trailing edge of VD signal or the nearest thereof, and conducts the adjustment of exposure time by increasing and decreasing the number of horizontal synchronizing signals for the electric shutter, i.e. the number of electric shutter pulses. At this point, the trailing edge of the VD signal is described as the F/E-IC setup confirmation timing.

In the prior art, the number of electric shutter pulses (exposure time) for recording the still image set up by the CPU block at the processing event A are loaded inside the F/E-IC at the trailing edge of VD (a), and decides the electric shutter A at the time of exposure for recording the still image. Next, the setup for loading all the pixels of still image is conducted by the processing event B. For example, when reading out all the pixels, for the CCD in which an interlace transfer is conducted, the setup of interlace reading out mode is carried out at this point. This setup becomes effective at the trailing edge (b) of next VD, and the output of the image data of interlace mode is conducted after the leading edge of VD.

Next, timing for shortening a time according to the present invention will be described with reference to FIG. 4. In the digital camera according to the present invention, when the photographing request of release operation is input by pressing the shutter release bottom (SW2) of user, the mechanical operation which is the processing before photographing a still image such as focusing is operated asynchronously to the synchronous period of CCD 101. On the other hand, the setup for starting exposure for recording is the setup for the F/E-IC 102, so that the timing in which this setup is to be effective should be synchronized to the exposure period timing signal VD. Therefore, in the example shown in FIG. 4, the elapsed time t1 from the VD right before the exposure setup operation, i.e. the VD right after the release operation of the previous VD till the beginning time of the exposure setup operation, i.e. the generation of the processing event A for setting up the exposure is measured by the timing part 104-3. A measurement method can be achieved by reading out the value of an internal counter (not shown) for generating the synchronizing signal in the CCD 1 signal processing block 104-1. The method can be also achieved by using the VD signal as an interrupt signal of the CPU 104 and by restarting an internal timer (not shown) in the CPU block 104-3 for this every interrupt signal.

The CPU block 104-3 calculates the remaining time t2 till the next VD shown by the reference numeral (a) by the division of the measured elapsed time t1 and the VD period which is set in the CCD 1 signal processing block by the CPU block 104-3.

The CPU block 104-3 compares the calculated time t2 and a predetermined time which is set previously, and if the calculated time t2 is more than the predetermined time, the CPU block conducts VD reset after carrying out the setup for recording exposure of the processing event A to the F/E-IC 102. The value which is set at this processing event A come into effective in the next VD.

At this point, the predetermined time is different depending upon a system such that the setup method is the serial communication or a parallel communication via bas, so that it is better for the predetermined time to be stored in the area in the ROM 108 where is rewritable by the communication from the external, for example.

In order to implement the VD reset, the CPU block 104-3 conducts the setup in order for the VD to enter immediately by resetting the value of internal counter, which sets the VD period, with respect to the CCD 1 signal processing block 104-1. The vertical synchronizing signal VD with the timing (a') which is shorter than the regular VD period is generated by this setup, and the F/E-IC 102, which is synchronized to the vertical synchronizing signal, starts an operation by the value which is set by the processing event A, so that the F/E-IC starts the exposure earlier than the regular VD period without waiting the regular VD period in accordance with the setup of the exposure for recording.

As described above, the prior art illustrated in FIG. 3 had to wait the regular VD illustrated by the reference numeral (a') in FIG. 3 to start the exposure for recording. However, according to the present invention, as illustrated in FIG. 4, the exposure for recording can be started in the time VD shown by the reference numeral (a') which is output earlier than the time shown by the reference numeral (a), so that it is possible to shorten the release time lag.

Figure 5:
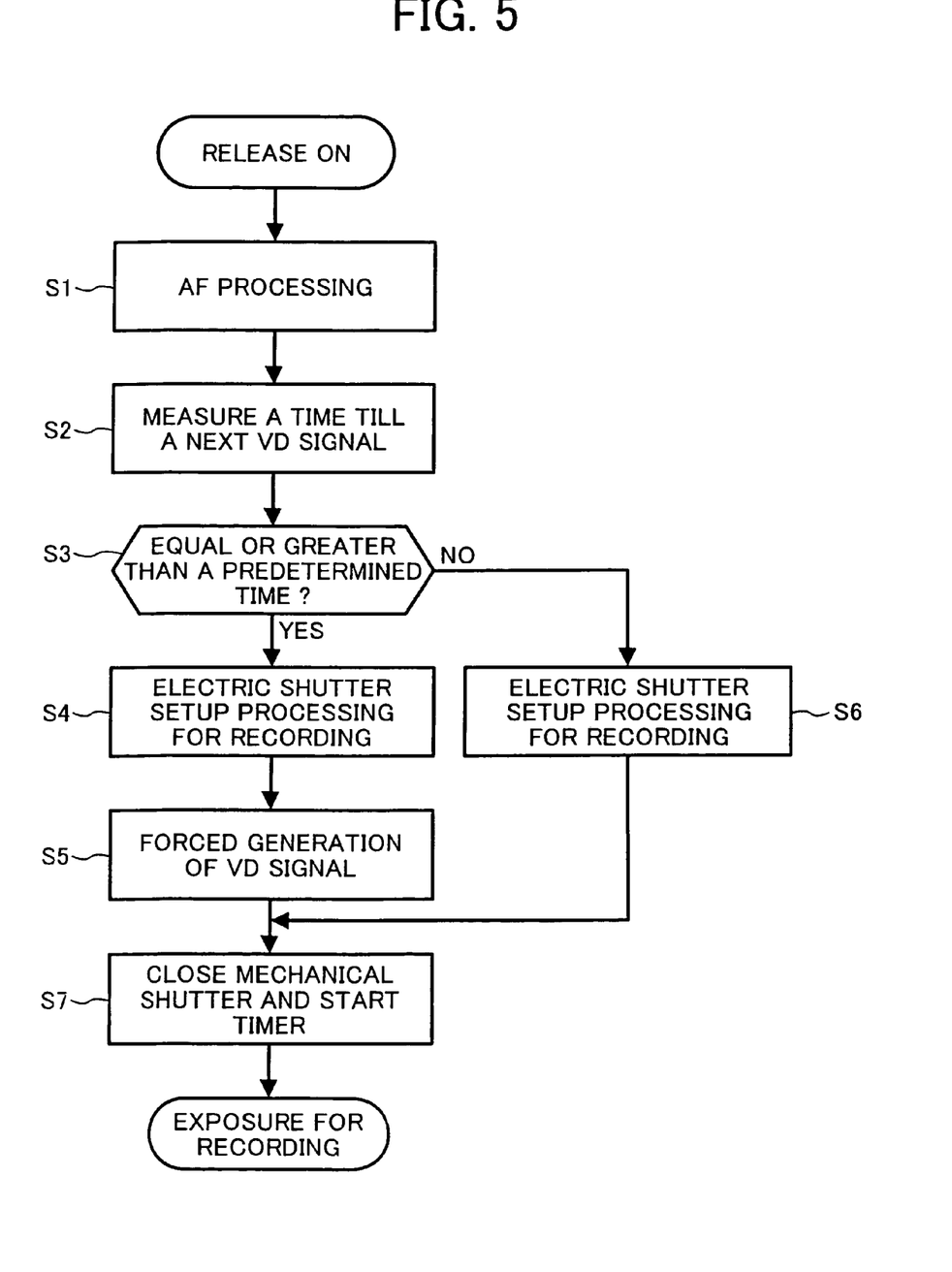
FIG. 5 is a flow chart illustrating the exposure operation in the first embodiment of digital camera according to the present invention.

FIG. 5 is the flow chart illustrating the operation of digital camera according to the present invention. When the shutter release button is turned ON (SW1), the auto focusing processing for recording is conducted in the step S1. After the focusing processing, the time t2 till the next VD is calculated by the measured time t1 from the VD till the event A for setting the exposure is started and the regular VD period in the step 2. In the step 3, the calculated time t2 and the predetermined time are compared.

If the calculated time t2 is more than the predetermined time, right after the setup to the F/E-IC 102 is completed in the step 4, the VD signal is forced to generate in the step S5, and then the setup comes into effect. In the meantime, when the calculated time t2 is smaller than the predetermined time, the setup comes into effect in the regular VD without the reset operation in the step S6.

After setting up the exposure, with the start of exposure, the timer (not shown) of mechanical shutter 7-4a is started as shown in the step S7, and the mechanical shutter is closed. After the mechanical shutter 7-4a is closed at the same time that the exposure is completed, the exposed all the pixels of CCD 101 are red out by reading out all the pixels such as the interlace transfer.

The predetermined time compared with the calculated time t2 can be adopted as the time requesting the setup of exposure to the F/E-IC 102. If the time requesting the setup of exposure is recognized, the effect of shortening by resetting the VD after setting the setup value can be judged, and the reset operation of VD based on this judgment is conducted.

Second Embodiment

Figure 6:
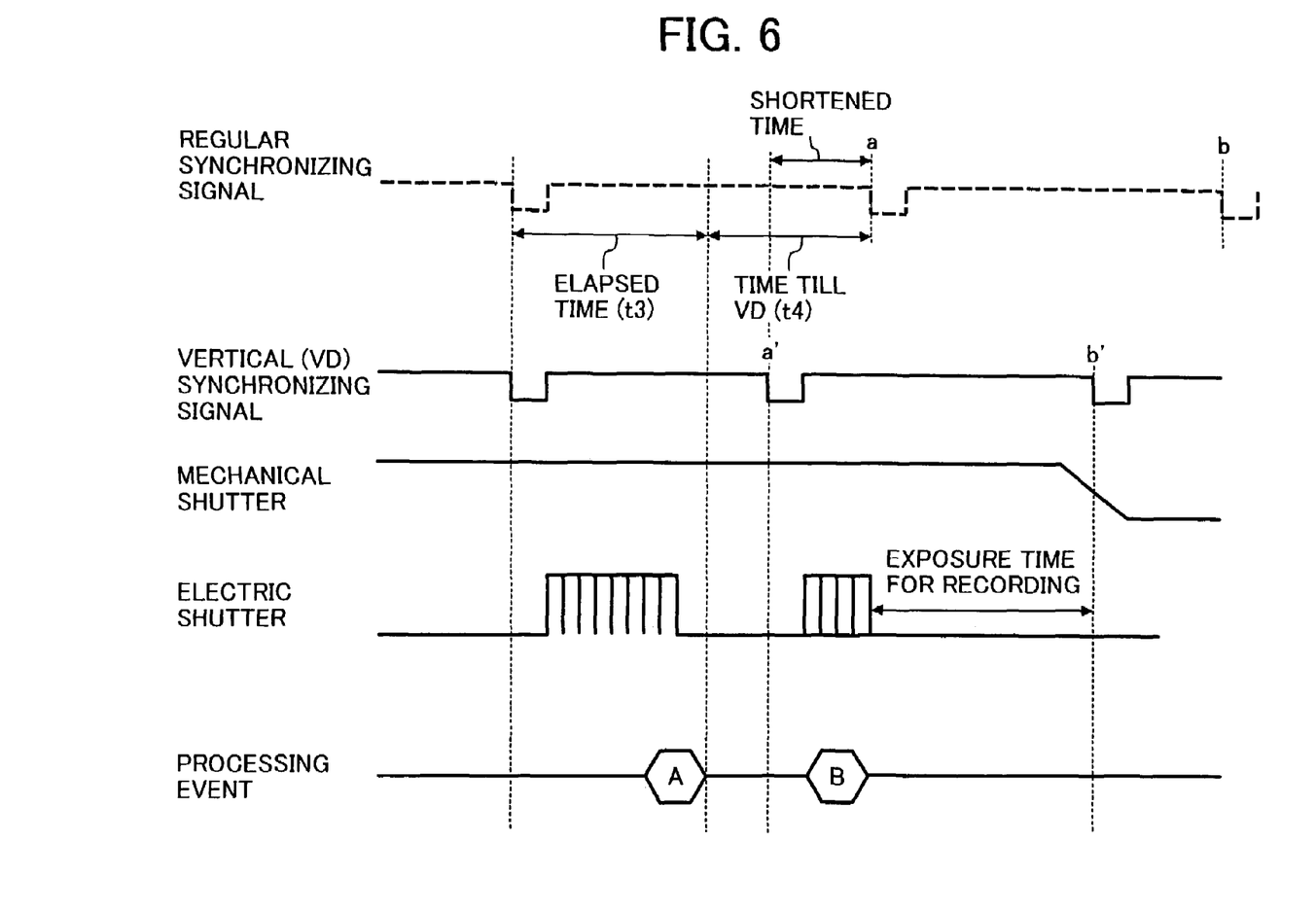
FIG. 6 is a timing chart illustrating an exposure operation in a second embodiment of digital camera according to the present invention.

In stead of measuring the elapsed time from the exposure period timing signal right after the release operation is conducted till the beginning of the exposure setup operation, as shown in FIG. 6, the elapsed time from the exposure period timing signal right after the release operation is conducted to the exposure setup operation is completed can be measured. As shown in the timing chart of FIG. 6, the elapsed time t3 from the previous VD till the setup of exposure to the F/E-IC 102 is completed is measured, and the remaining time t4 till the next VD is calculated, and then the judgment whether or not the VD reset is conducted by this calculated time t4. When the calculated time t4 is more than the predetermined time, as shown in FIG. 6, the exposure for recording can be started in the time of VD shown as the reference numeral (a') which is output earlier than the time shown as the reference numeral (a), so that the shortening of release time lag can be achieved. The example shown in FIG. 6 is effective for a system in which the processing time of processing event A of the setup to the F/E-IC 102 is changed irregularly.

Third Embodiment

Figure 7:
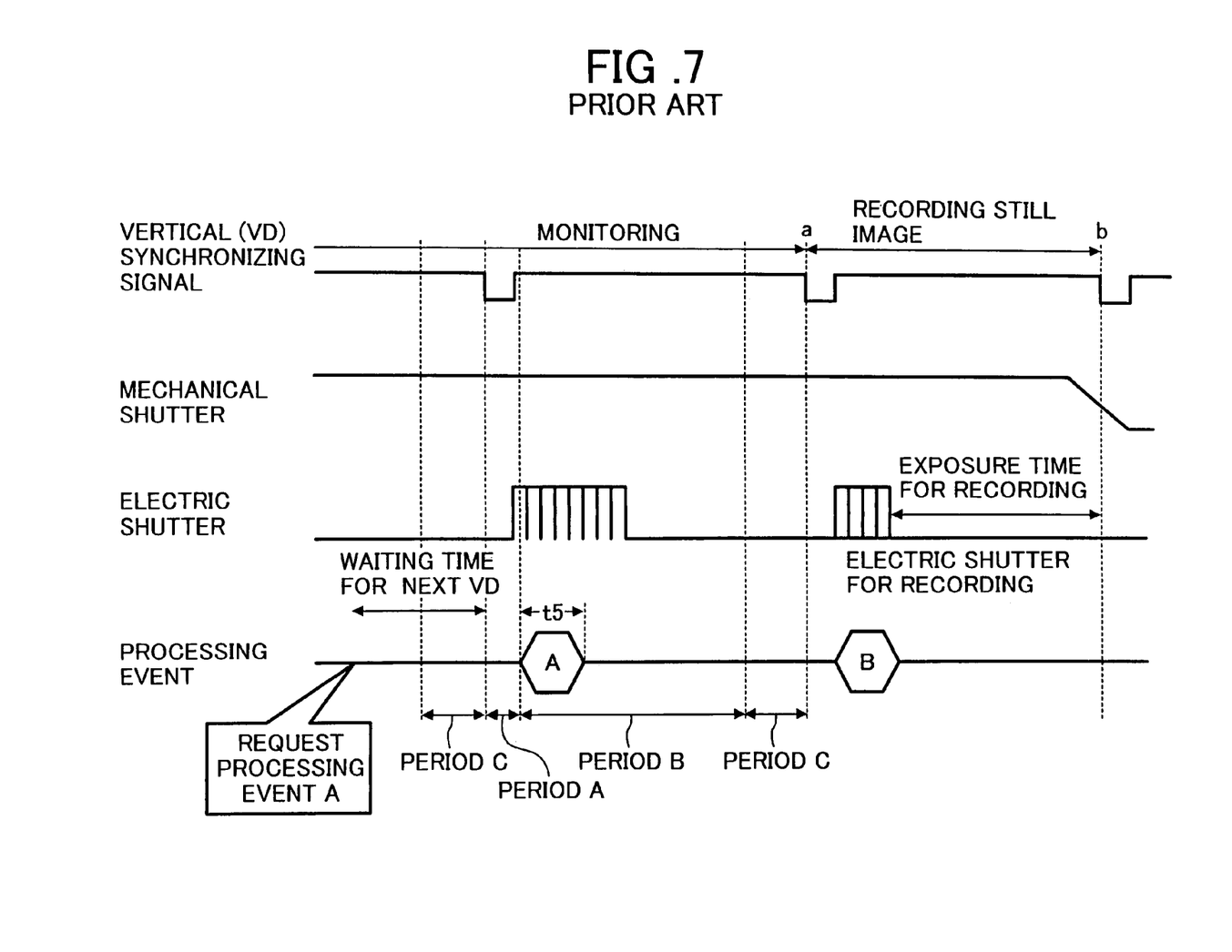
FIG. 7 is a timing chart illustrating the other exposure operation of conventional digital camera.
Figure 8:
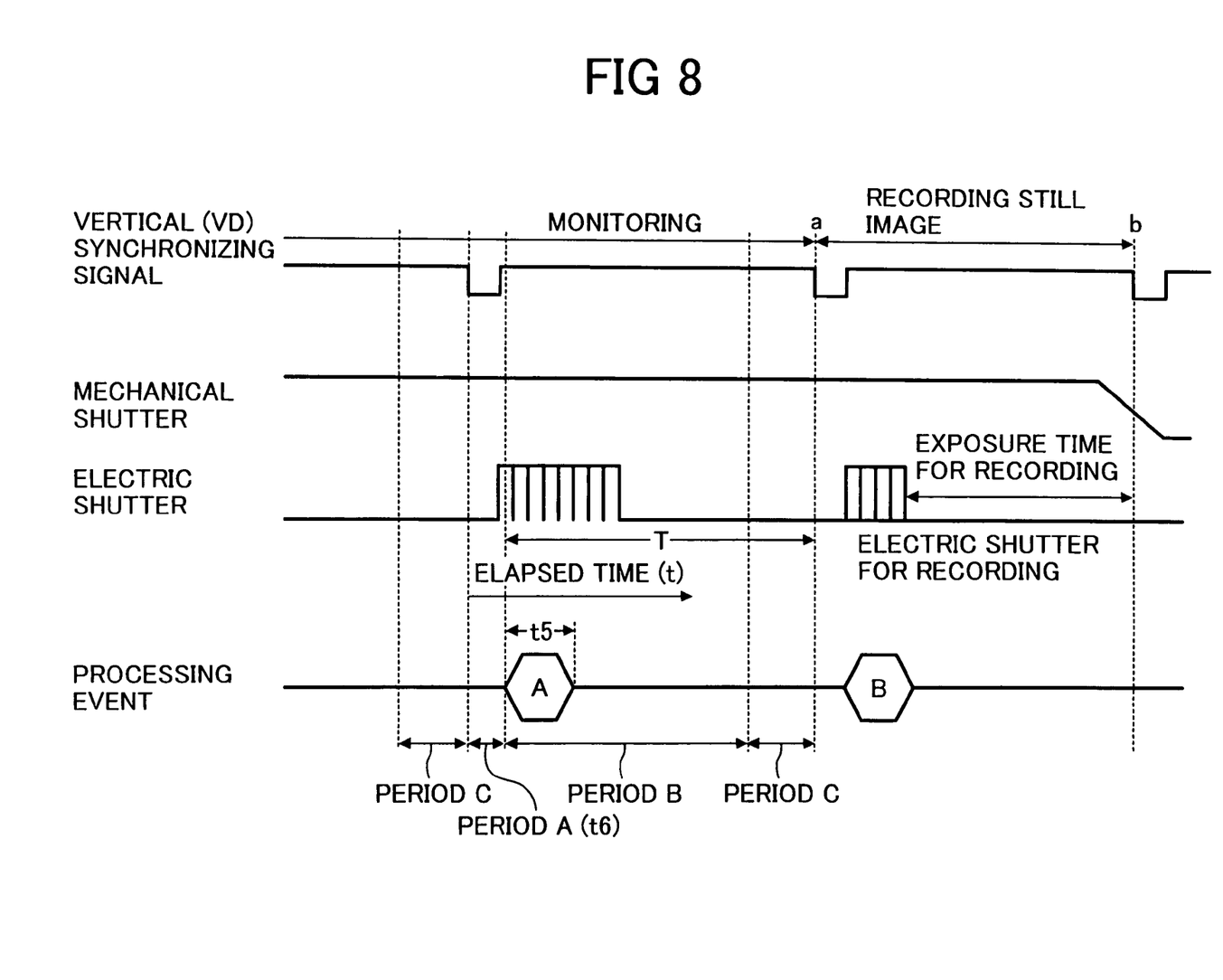
FIG. 8 is a timing chart illustrating an operation in a third embodiment of digital camera according to the present invention.

Next, the timing chart of FIG. 8 illustrating a third embodiment of the present invention will be described by comparing it with FIG. 7 illustrating its prior art.

FIG. 7 shows the same timing with FIG. 3 by the conventional method. The F/E-IC changes the operation mode of next exposures period by the data set up till the F/E-IC setup confirmation timing of the trailing edge of VD signal or the nearest thereof as described with reference to FIG. 3, and conducts the adjustment of exposure time by increasing and decreasing the number of horizontal synchronizing signals for the electric shutters, i.e. the number of the electric shutters. As described above, the description is given by adopting the tailing edge of VD signal as the F/E-IC setup confirmation timing.

For the prior art illustrated in FIG. 7, as shown in FIG. 3, the number of electric shutters (exposure time) for recording the still image set up by the CPU block at the processing event A are loaded inside the F/E-IC at the trailing edge of VD (a), and decides the electric shutter A at the time of exposure for recording the still image. Next, the setup for loading all the pixels of still image is conducted by the processing event B. For example, when reading out all the pixels, for the CCD in which the interlace transfer is conducted, the setup of interlace reading out mode is carried out at this point. This setup becomes effective at the trailing edge (b) of next VD, and the output of the image data of interlace mode is conducted after the leading edge of VD.

When carrying out the auto focusing (AF) operation after the shutter release bottom is pressed (after the input requiring for the exposure setup processing event A), the movement of mechanism which is asynchronous to the VD is operated. The moving amount of the mechanism is different depending on the distance to the object, so that the moving time is different depending on photographing. After that the timing for beginning the exposure setup to the F/E-IC for recording the still image becomes asynchronous to the VD. In order to synchronize the timing for beginning this processing event A and the VD, it is required to wait the next VD.

Therefore, in the conventional method illustrated in FIG. 7, if the input requesting the processing event A by the release operation is generated in any period such as the period A, the period B, and the period C, the conventional method waits the VD right after the processing event A is required, i.e. the next VD, as long as generating the processing event A which is synchronized to the tailing edge of the vertical synchronizing signal VD, so that when the processing event A is required right after the VD, one exposure period had to be waited at the maximum. At this point, the period A is the period for prohibiting the control value setup to the F/E-IC. The period C is the period from the point, where the time t1 requesting the exposure setup is subtracted from the next VD, till the next VD. The period B is the period between the both periods of A and C.

Next, the timing for shortening a time in the third embodiment of the present invention will be described with reference to the FIG. 8.

In the digital camera according to the third embodiment of the present invention, when the request of processing event A which is the photographing request is input by pressing the shutter release bottom SW2 of user, the input requesting the processing event A of the release operation is judged whether or not it is input in a period A, period B, and period C.

For this judgment, as shown in FIG. 8, the previous VD, in other words, the elapsed time (t) from the VD right before the input requesting the processing event A till the input requesting the processing event A by the release operation is measured by the timing part 104-3. A measurement method can be achieved by reading out the value of internal counter (not shown) for generating the synchronizing timing signal provided in the CCD 1 signal processing block 104-1. Moreover, the measurement method can be achieved by using the VD signal as the interrupt signal of CPU 104, and by restarting the internal timer (not shown) in the CPU block 104-3 for every interrupt signal.

The CPU block 104-3 calculates the remaining time (T-t) till the next VD shown as the reference numeral (a) by the division of the measured elapsed time (t) and the VD period T set up in the CCD 1 signal processing block 104-1 by the CPU block 104-3.

The CPU block 104-3 compares the calculated time (T-t) and the preset first predetermined time, and then if the calculated time (T-t) is equal or less than the first predetermined time; it is judged that the processing event A is required in the period C. In this case, the CPU block 104-3 carries out the exposure setup to the image pick up control part 102 of the processing event A after waiting the next VD (a). This first predetermined time is the time requesting the exposure setup to the F/E-IC of the image pick up control part 102, in other words, the time required (t5) from the beginning of the exposure setup till its completion.

For example, in case of setting up the exposure by the serial communication, if the setup to the F/E-IC 102 is begun in the period C, in the case such that the timing of completion for sending the data of setup vale and the timing for confirming the setup for the F/E-IC are substantially synchronized, it becomes unknown that the next exposure period is operated by which operation.

In order to prevent this disorder, if the calculated time (T-t) is judged to be equal or less than the period C, i.e. the time (t5) required from the beginning of the exposure setup to its complement, as described above, the exposure setup to the image pick up control part 102 of the processing event A is carried out after waiting the next VD (a). The timing gap of the timer start of the mechanical shutter by the above described disorder can be thereby prevented.

The time (t5) requesting the exposure setup of the first predetermined time is different depending on a system such that the setup method is a serial communication or a parallel communication via a bus, so that it is better to be stored in an area of ROM 108 where is rewriteable by the communication from an external.

When the calculated time (T-t) is judged to be in the period C, as long as the processing event A of the setup for recording exposure is setup to the F/E-IC 102 normally, the exposure setup which is set in the image pick up control part 102 becomes effective from the timing (a) as described above, and the CPU block 104-3 starts the timer (not shown) of mechanical shutter 7-4a with the beginning of exposure, then closes the mechanical shutter with the completion of exposure. After the mechanical shutter 7-4a is closed, the exposed all the pixels of CCD 101 are red out by reading out all the pixels of interlace transfer and so on set by the processing event B.

Next, the processing when the request of the processing event A is input in the period A will be described. The time which is provided by the period A of FIG. 8 is a second predetermined time t6, and this period A of FIG. 8 is the second predetermined time (t6), and is thought as setup prohibition period to the F/E-IC 102, and so on. The setup to the F/E-IC 102 is not to be conducted during this setup prohibition period.

In order to prevent the exposure setup to the F/E-IC 102 in this setup prohibition period A, the timing part 104-3 measures the elapsed time (t) from the VD right before the input requesting the processing event A to the input requesting the processing event A, and if the time t is equal or less than the second predetermined time t6, it is judged that the request of processing event A is input in the period A. In this case, after the competition of period A is waited, i.e. after the time t5 of the predetermined period A is passed, setting up data to the setup prohibition period A can be avoided by conducing the exposure setup to the image pickup control part 102 of the processing event A. The shortening time of the maximum 1 exposure period can be thereby achieved comparing to the conventional method which always waits the next VD.

Lastly, the processing when the requirement of processing event A is input in the period B will be described. The timing part 104-3 measures the elapsed time (t) from the VD right before the input requesting the processing event A, and then if it is judged that the processing event A is input in the period B, the exposure setup to the image pick up control part 102 of the processing event A is conducted immediately.

Figure 9:
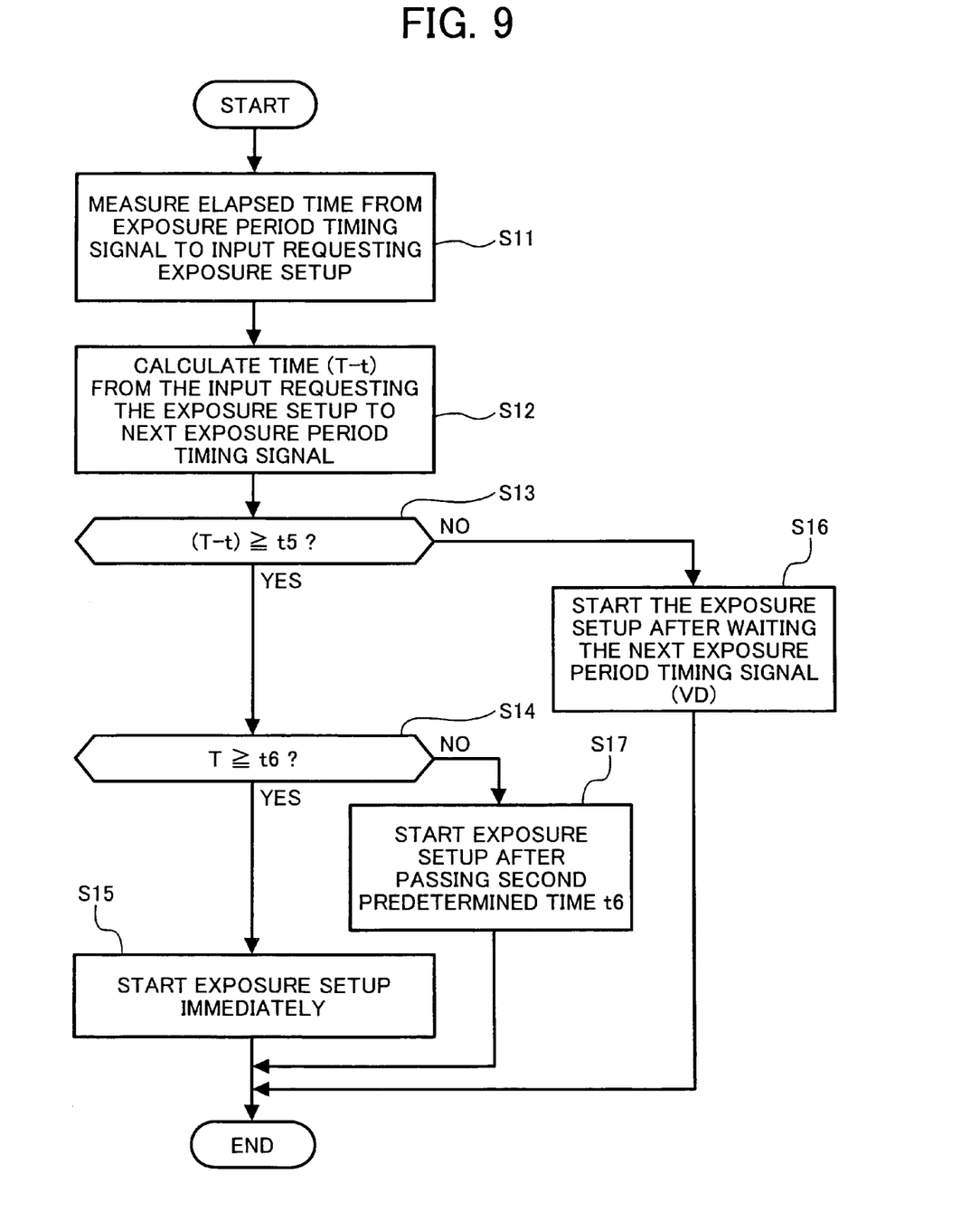
FIG. 9 is a flow chart illustrating the exposure setup operation in the third embodiment of digital camera according to the present invention.

In order to judge whether or not the request of the processing event A is input in the period B, the CPU block 104-3 carries out following processing of each step in accordance with the flow chart shown in FIG. 9.

When the elapsed time (t) from the VD right before the input requesting the processing event A is measured by the CPU block 104-3 (step S11), the time (T-t) from the input requesting the processing event A to the generation of next exposure period timing signal (a) is calculated by using the elapsed time (t) which is measured as described above (step 12). The calculated value (T-t) is judged whether or not it is equal or greater than the first predetermined time (t5) in the step S13. If the calculated time (T-t) is judged to be equal or greater than the first predetermined time (t5), the elapsed time (t) measured by the step 11 is judged whether or not it is the time (t6) within the setup prohibition period which is the second predetermined time (step 14).

When the elapsed time (t) is judged to be equal or greater than the second predetermined time t6 in the step S14, it is judged that the request of the processing event A was input in the period B.

The period B is not the setup prohibition period to the F/E-IC 102, and also the period B has the time from the previous setup to the image pickup control part 102 is completed to the setup confirmation timing to the F/E-IC 102 is adopted, so that it is judged that the request of processing event A is input in the period B, the setup can be begun immediately. Consequently, as shown in the step S 15, the exposure setup processing to the image pickup control part 102 is carried out immediately. In this case, the time period for adding value (B+C) of the period B and period C can be shortened at the maximum comparing to the conventional method.

On the other hand, when the calculated value (T-t) obtained by the step S12 is judged to be less than the first predetermined time (t5) in the step S14, it is judged that the request of the processing event A is input in the period C as described above, and the exposure setup to the image pickup control part 102 is carried out after waiting the next VD (a).

Moreover, in the step S14, if the elapsed time t is judged to be less than the second predetermined time t6, the request of the processing event A is judged to be input in the period A, so that the exposure setup for the image pickup control part 102 is carried out after the setup prohibition period A, i.e. after the time t6 is passed. Therefore, the time of 1 exposure period at the maximum can be achieved comparing to the conventional method.

As described above, according to the first and second devices according to the first aspect of the present invention, a time can be shortened by setting up the setup, which is forced to output the VD of exposure period timing signal, from the CPU block 104-3 to the CCD 1 signal processing block 104-1.

The methods described in the first aspect of the present invention are the photographing methods which are corresponded in order to achieve the devices according to the first aspect of the present invention. The first method described in the first aspect is the photographing method including the step S2 and step S3 shown in FIG. 5, and the elapsed time t1 from, for example, the exposure period timing signal right after the release operation which is also the exposure period timing signal right before the beginning of the exposure setup operation to the beginning of the exposure setup operation is adopted as the elapsed time which is compared with the predetermined time in the step S3.

The second method in the second aspect of the present invention is the photographing method including the step S2 and the step S3 shown in FIG. 5, and the elapsed time t3 from, for example, the exposure period timing signal right after the release operation which is also the exposure period timing signal right before the beginning of the exposure setup operation till the completion of the exposure setup operation is adopted as the elapsed time which is compared with the predetermined time in the step S3.

The programming according to the first aspect of the present invention is the control program in order to achieve the first and the second devices in the first aspect of the present invention. This control program is stored in the ROM 108.

The recording media according to the first aspect of the present invention is the recording medium which records the programming of the first aspect. The control program according to the present invention can be stored in the conventionally known recording medium such as CD-ROM, and MO, and the method of the present invention can be carried out easily by implementing this program with the CPU of digital camera.

According to the first device and the first method according to the first aspect of the present invention, the elapsed time from the exposure period timing signal right before the beginning of the exposure setup operation till the beginning of the exposure setup operation is measured, and the time till the next exposure period timing signal is generated can be shortened from the normal exposure period in accordance with the comparison result between the time from the beginning of exposure setup operation till the generation of next exposure period timing signal and the time required for conducting the setup of exposure, for example, which are obtained by using the measured elapsed time, so that a release time lag can be shortened.

According the second device and the second method according to the first aspect of the present invention, the elapsed time from the exposure period timing signal right before the beginning of the exposure setup operation till the completion of the exposure setup operation is measured, and the time till the generation of next exposure period timing signal can be shortened from the normal exposure period in accordance with the comparison result between the time till the generation of next exposure period timing signal and the predetermined time which are obtained by using the measured elapsed time, so that the release time lag can be shortened appropriately regardless of increase and decrease of time required for conducting the setup of exposure.

According to the programming in the second aspect of the present invention, the present invention can be implemented relatively easy.

According to the first device and the first method in the second aspect of the present invention, in the exposure setup for the image pick up device, the correspondence between the completion the completion timing of data transmission of setup value and its setup confirmation timing is prevented, and the improper operation of operation part such as the mechanical shutter by overlapping these trimmings can be certainly prevented.

According to the second device and the second method in the second aspect of the present invention, the exposure setup for the image pick up control part is prevented in the exposure setup prohibition period, and the exposure setup is immediately carried out right after the exposure setup prohibition period is passed, so that the shortening time of the maximum 1 exposure period can be archived compared to the conventional method which always waits the next VD.

According to the third device and the third method in the second aspect of the present invention, when the request of the processing event A is input, the exposure setup processing to the image pick up control part can be carried out immediately without waiting the passing of exposure setup prohibition period for the image pick up control part or without waiting the generation of next exposure period timing signal.

What is claimed is:

1. An imaging apparatus comprising:
    an exposure period setup part configured to generate a timing signal which prescribes an exposure period of an image pick up device;
    a control part for the image pickup device configured to control an operation of said image pick up device in synchronization with said timing signal of the exposure period;
    a timing part configured to measure an elapsed time from the timing signal of the exposure period; and
    an imaging apparatus control part configured to control said control part for the image pick up device and said exposure period setup part, wherein
    said timing part measures the elapsed time from the exposure period timing signal right before a beginning of an exposure setup operation to the beginning of the exposure setup operation by said exposure period setup part, and when a time from the beginning of the exposure setup operation to a generation of a next exposure period timing signal for a regular exposure period, the time being calculated by using the measured elapsed time, is equal to or greater than a predetermined time, said imaging apparatus control part shortens the time till the generation of the next exposure period timing signal from the regular exposure period, and
    said exposure setup operation includes setting a number of electric shutter pulses so as to adjust an exposure time.

2. The imaging apparatus according to claim 1, wherein said predetermined time is a time required for conducting the exposure setup operation to said control part for the image pickup device.

3. The imaging apparatus according to claim 1, wherein in order to shorten the time till the generation of the exposure period timing, the exposure period timing signal is generated earlier than the regular exposure period, right after the exposure setup operation to said control part for the image pickup device, and the exposure period is thereby begun.

4. An imaging method comprising the steps of:
    preparing an image apparatus including an exposure period setup part configured to generate a timing signal which prescribes an exposure period of an image pick up device, an image pick up device control part configured to control the image pick up device by synchronizing to the exposure period timing signal, a timing part configured to measure an elapsed time from the exposure period timing signal, and an imaging apparatus control part configured to control the image pick up device control part and said exposure period setup part;
    measuring the elapsed time from the exposure period timing signal right before a beginning of an exposure setup operation to the beginning of the exposure setup operation by said exposure period setup part, the exposure setup operation including setting a number of electric shutter pulses so as to adjust an exposure time; and
    judging whether or not a time from the beginning of the exposure setup operation to a generation of a next exposure period timing signal for a regular exposure period, the time being calculated by using the measured elapsed time, is equal to or greater than a predetermined time,
    shortening the time till the generation of the next exposure period timing signal when the time till the generation of the next exposure period timing signal is judged to be equal or greater than the predetermined time by said judging step.

5. The imaging method according to claim 4, wherein said predetermined time is a time required for conducting the exposure setup operation to said image pick up device control part.

6. The imaging method according to claim 4, wherein in order to shorten the time till the generation of the exposure period timing, the exposure period timing signal is generated earlier than the regular exposure period, right after the exposure setup operation to said image pick up device control part, and the exposure period is thereby begun.

7. A computer-readable medium including computer executable instructions provided in an imaging apparatus including an exposure period setup part configured to generate a timing signal which prescribes an exposure period of an image pick up device, an image pick up device control part configured to control the image pick up device by synchronizing to the exposure period timing signal, a timing part configured to measure an elapsed time from the exposure period timing signal, and an imaging apparatus control part configured to control said image pick up device control part and said exposure period setup part, the computer executable instructions causing the processor to perform a method comprising:
    measuring the elapsed time from the exposure period timing signal right before a beginning of an exposure setup operation to the beginning of the exposure setup operation by said exposure period setup part, the exposure setup operation including setting a number of electric shutter pulses so as to adjust an exposure time;
    judging whether or not a time from the beginning of the exposure setup operation to a generation of a next exposure period timing signal for a regular exposure period, the time being calculated by using the measured elapsed time, is equal or greater than a predetermined time; and
    outputting the exposure period timing signal for beginning the exposure period earlier than a generation of a regular next exposure period timing signal when the time till the generation of the next exposure period timing signal is judged to be equal to or greater than the predetermined time by said judging step.

8. The control program according to claim 7, wherein said predetermined time is a time required for conducting the exposure setup operation to said image pick up device control part.

9. The control program according to claim 7, wherein in order to shorten the time till the generation of the exposure period timing, the exposure period timing signal is generated earlier than a regular exposure period, right after the exposure setup operation to said image pick up device control part, and the exposure period is thereby begun.

* * * * *